United States Patent [19]

Call et al.

[11] 4,158,235
[45] Jun. 12, 1979

[54] MULTI PORT TIME-SHARED ASSOCIATIVE BUFFER STORAGE POOL

[75] Inventors: Duane B. Call, Provo, Utah; Larry K. Hopkins, Carlsbad, Calif.

[73] Assignee: Burroughs Corporation, Detroit, Mich.

[21] Appl. No.: 788,556

[22] Filed: Apr. 18, 1977

[51] Int. Cl.$^2$ .......................... G06F 13/00; G06F 9/20
[52] U.S. Cl. ...................................... 364/900; 365/49
[58] Field of Search ... 364/200 MS File, 900 MS File; 365/49, 50

[56] References Cited

U.S. PATENT DOCUMENTS

| | | | |
|---|---|---|---|
| 3,349,375 | 10/1967 | Seeber et al. | 364/200 |
| 3,436,733 | 4/1969 | Pearce | 364/900 |
| 3,585,605 | 6/1971 | Gardner et al. | 364/200 |
| 3,618,027 | 11/1971 | Feng | 364/900 |
| 3,648,254 | 3/1972 | Beausoleil | 364/900 |
| 3,936,806 | 2/1976 | Batcher | 364/200 |
| 3,967,247 | 6/1976 | Andersen et al. | 364/200 |
| 3,997,882 | 12/1976 | Goyal | 365/49 |
| 4,056,844 | 11/1977 | Izumi | 364/200 |
| 4,070,706 | 1/1978 | Scheuneman | 364/200 |

Primary Examiner—Mark E. Nusbaum
Attorney, Agent, or Firm—Edward J. Feeney, Jr.; Robert J. Gaybrick; Kevin R. Peterson

[57] ABSTRACT

A buffer storage system having divisible data storage space which is time-shared by a plurality of external data devices and is accessed by at least two independently clocked bidirectional access ports. The storage system is modular and comprises a variable number of fixed-sized buffer cells, each of which may be associatively addressed by any of the access ports. The transfer of data is at a clock rate determined by the particular accessing port; and the transfer is performed serially to achieve variable field length capability and a reduction in hardware. The amount of total storage space can be easily varied by changing the physical number of buffer cells in the buffer system.

12 Claims, 4 Drawing Figures

MULTI PORT TIME-SHARED ASSOCIATIVE BUFFER STORAGE POOL

BACKGROUND OF THE PRESENT INVENTION

The present invention generally relates to a buffer storage system or buffer pool for buffering data which is being tansferred between data devices having different clock rates. Specifically, the buffer pool of the present invention contemplates the use of a common pool of small buffers, each with content addressability, by a plurality of bidirectional accessing ports. Each accessing port is capable of accessing any number of small buffer units which are not already attached to another port. In the particular embodiment disclosed, the total amount of buffer space may be altered by inserting or removing circuit cards on which the individual buffer units are packaged.

Computer systems generally use buffer storage systems to allow the transfer of data between data devices which have different clock rates. For example, when data is being transferred from a high speed device such as a magnetic disk to a slower device such as a magnetic tape, the data being read from the magnetic disk is first stored in a temporary buffer from which it is subsequently transferred to the magnetic tape at the correspondingly slower rate of the magnetic tape device. Prior art data transfer devices and techniques generally employed a plurality of fixed-size double buffers individually assigned to respective data lines or paths. The data paths were generally selected for either information input or information output but not for both. The use of a fixed buffer for each data path insured that each data path would have some buffer space when it was needed but such implementation necessarily required the use of a large buffer space for each data path in the event that a large amount of buffer space would be required. In practice, however, it has been found that the need for a large amount of buffer space by any particular data path is infrequent and that the simultaneous need of a plurality of data paths for extensive amounts of buffer space is also rare. Thus it is clear that in prior art systems using fixed-size double buffers for each input or output data path or port wastes a considerable amount of buffer storge space. Moreover, the amount of space that is wasted is cumulative since most computer systems include a large number of periphal devices. A further disadvantage of the prior art systems is the use of parallel transfer apparatus which necessarily standardizes data field lengths. Other difficulties with prior art systems include the necessity of a special program-controlled address-mapping apparatus and the generally fixed size of the buffer space available to each data port.

SUMMARY OF THE INVENTION

It is therefore an object of the present invention to provide a buffer storage system for a plurality of data paths or ports wherein the aggregate buffer memory requirement is reduced.

Another object of the present invention is to provide a buffer system for a plurality of data paths wherein the amount of buffer space allocated to each data port will vary with the particular need of each data port.

A further object of the present invention is to provide a buffer system wherein the total buffer storage space comprises a plurality of small buffer units which may be independently allocated to any of the data ports.

Still another object of the present invention is to provide a buffer storage system having a plurality of small buffer units wherein each buffer unit is associatively addressed.

A further object of the present invention is to provide a buffer storage system wherein the data transfer rate of the data ports may be independent of each other and wherein the independent data transfer rate of a data port determines the transfer rate of the particular buffer unit.

Still another object of the present invention is to provide a buffer storage system wherein the data manipulations are performed serially to reduce hardware requirements.

A further object of the present invention is to provide a buffer system for accepting data having variable field lengths.

Another object of this invention is to provide a buffer storage system which transfers data between multiple data ports in a bidirectional manner.

These and other objects are attained by the present invention by providing a buffer pool system including a plurality of small buffer units which are all commonly used by a plurality of input/output data paths. The individual buffer units are time-shared by all of the data paths in the sense that none of the buffer units are exclusively assigned to a particular data path but may be allocated and accessed by any data path depending on requirements and availability. Each of the individual buffer units is of fixed size and is associatively addressed. The transfer of data is performed serially in order to reduce the amount of hardware required and also allows an easy implementation of variable field length capability. The transfer of data is at a clock rate determined by the particular accessing port and is independent of any other input/output path.

BRIEF DESCRIPTION OF THE DRAWING

Other objects, features and advantages of this invention will be readily apparent and thoroughly understood by reference to the following detailed description when read in conjunction with the accompanying drawing wherein.

DETAILED DESCRIPTION OF THE PREFERRED EMBODIMENT

Figure 1:
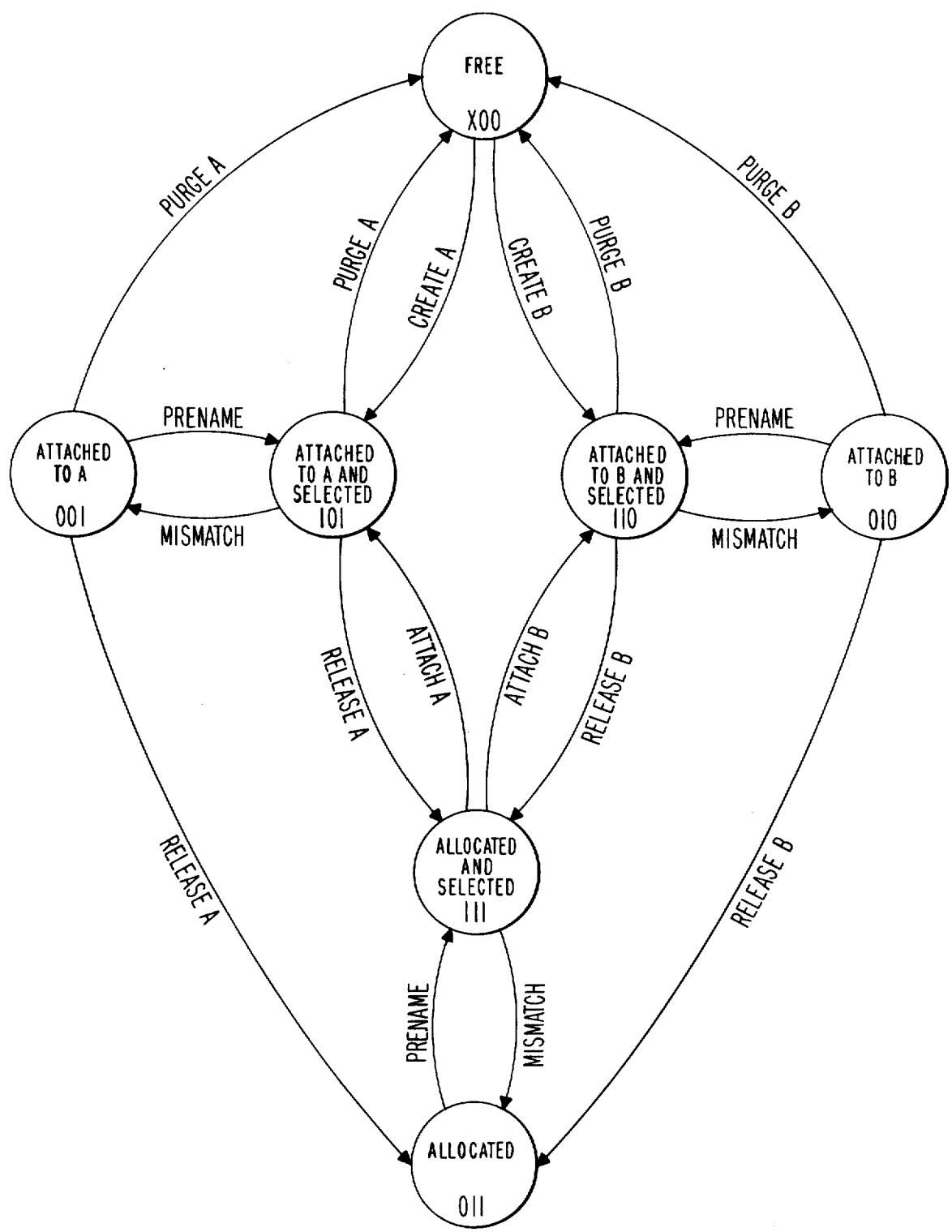
FIG. 1 is a state-transition diagram of the possible states and transition stages of each of the plurality of buffer units used in the present invention.

With reference to FIG. 1 of the drawing, the state which a single buffer cell may attain in the various transitions from one state to another will initially be discussed with regard to a single buffer unit used in a two-port system. Labelled circles indicate the various states into which the unit buffer cell may be placed. The connecting lines which terminate in arrowheads indicate the possible transition stages between the given states. These transition stages, called decision variable names, are defined below in tabular form along with the state names which designate the various states of the unit buffer cell.

STATE NAMES

Free: the cell is empty or uncommitted for use.

Attached to A/B: the cell, having previously been named by either of the ports A/B, is enabled for reading, writing and other allowed uses by that port.

Allocated: the cell holds a valid name and possibly has some data stored but it is not attached to either port.

Selected: the cell, whether it has been attached to a port or not, is the last cell named by either of the ports.

DECISION VARIABLE NAMES

CREATE A/B: assigns the last name transmitted to a free cell and attaches it to port A/B for accessing. Until another name is transmitted, the newly attached cell also remains selected.

PURGE A/B: returns the cell attached to the specified port to the free state. The cell purged need not be the last one to have been named.

RELEASE A/B: disables the cell currently attached to the specified port. The cell enters the allocated state in which its name and data are preserved for subsequent accessing. The selected status of the cell is unaffected by this operation.

ATTACH A/B: if the cell last named, and therefore selected, exists but is not already in the attached state, i.e. if the cell is in the allocated state, it is attached for use on the specified port.

PRENAME: at the time a new name is passed for self selection, all named cells instanteously change to a selected state. This has no effect on the functioning of a cell attached to one of the ports.

MISMATCH: following the prename signal, the new name is compared with the existing names in all attached or allocated cells. The comparision is serial within each cell and sequential amongst the successive cells. If any difference between the two names is encountered, the mismatched cell is moved from its selected state to its corresponding attached or allocated and unselected state. Assuming proper creation of a named cell, only one cell in the entire pool of cells will remain selected following the passage of an entire name.

Referring to FIG. 1 the possible states of the memory cells have been labeled in accordance with their use in a two port accessing system, i.e. port A port B. A cell in the free state XOO may be selected and attached to port A or port B respectively responsive to a CREATE A signal or a CREATE B signal. Cells are returned to the Free State XOO from the Attached To Port A And Selected State 101 or the Attached to Port A State 001 by a PURGE A signal. Likewise, a cell in the Attached To Port B And Selected State 110 or Attached To Port B State 010 is returned to the Free State XOO by a PURGE B signal. A cell attains the Attached To Port A And Selected State 101 by the previously mentioned CREATE A signal or from the Attached To Port A State 001 following a PRENAME signal. Also, a cell in the Allocated And Selected State 111 enters the Attached To Port A And Selected State 101 responsive to an ATTACH A signal. A cell enters the Attached To Port B And Selected State 110 from either the Free State XOO responsive to a CREATE B signal, the Attached To Port B State 010 responsive to a PRENAME signal or from the Allocated and Selected State 111 upon the occurrence of an ATTACH B signal. A cell assumes the Attached To Port A State 011 from the Attached To Port A And Selected State 101 responsive to a MISMATCH signal generated from the failure of a new name entry to match the name assigned to the Attached And Selected cell. A cell assumes the Attached To Port B State 010 from the Attached To Port B And Selected State 110 responsive to a MISMATCH signal generated by the failure of the name assigned to Attached and Selected cell to match a new name entry. A buffer cell enters the Allocated and Selected State 110 from either the Attached To Port A And Selected State 101 or the Attached To Port B And Selected State 110 responsive to a respective RELEASE A or a RELEASE B signal respectively. A cell will assume the Allocated and Selected State 111 from the Allocated State Oil responsive to a PRENAME signal. Finally, a memory cell assumes the Allocated State 011 responsive to a MISMATCH signal generated by the failure of the name of the allocated and selected cell 111 to match a new name entry following the PRENAME signal. A memory cell also assumes the Allocated State Oil from the Attached To Port A State 001 or the Attached To Port B State 010 respectively responsive to a RELEASE A signal or a RELEASE B signal.

Figure 2:
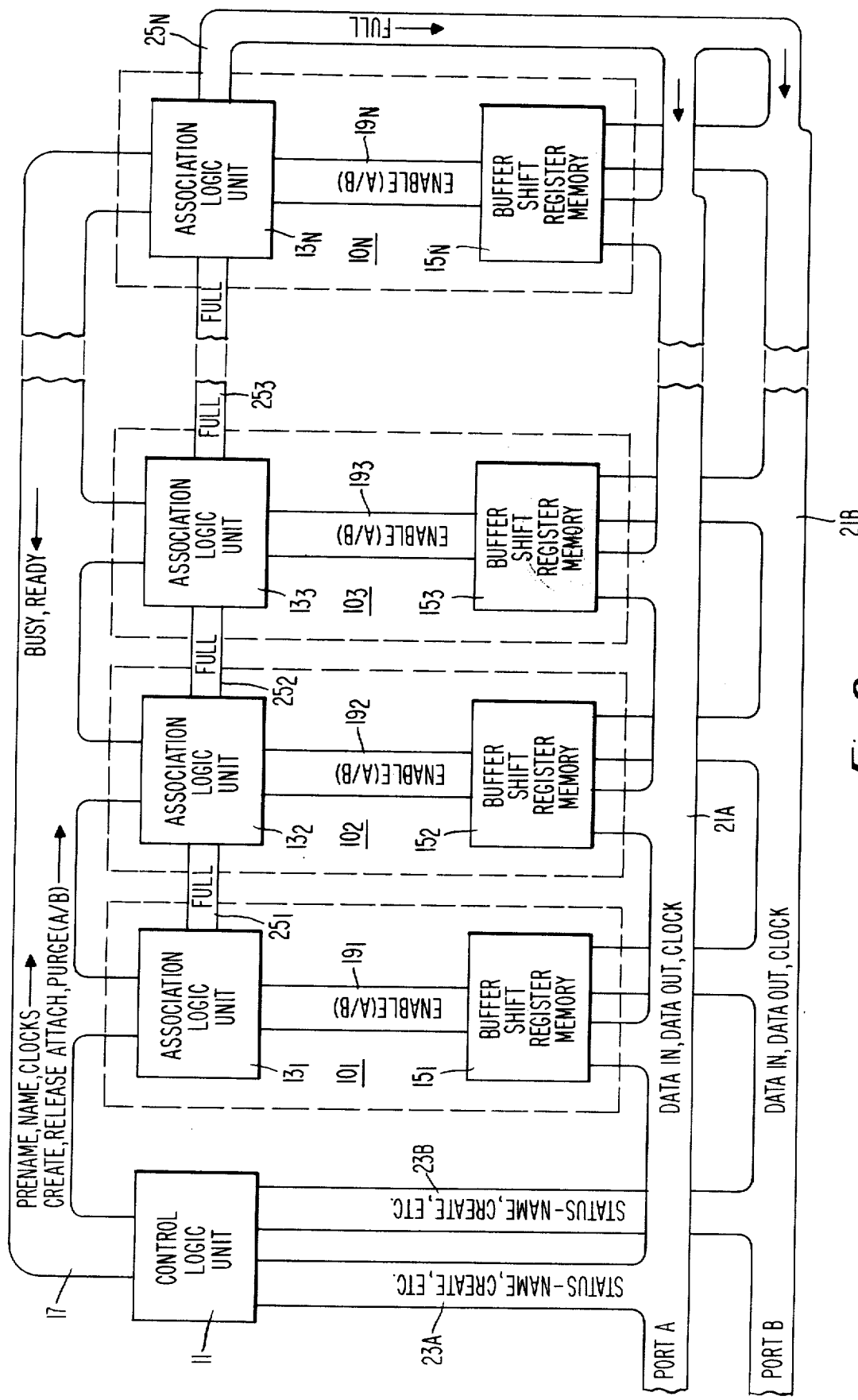
FIG. 2 is a block diagram of the buffer system of the present invention showing a plurality of buffer memories and associative logic units which taken in respective pairs comprise the memory buffer cells.

The block diagram of FIG. 2 shows a two-port buffer system having a plurality of individual buffer units. The system includes port A and port B for accessing the available buffer space. A control logic unit 11 accepts certain decision variable names or commands from ports A and B. The control logic unit 11 may be a simple device for allocating access control between the two ports A and B and may also be used to insure the proper sequencing of other commands, but such sequencing control is not necessary in the present system. The control mechanism 11 is an allocating circuit which decides which of the two ports A or B will transmit the name signal to the plurality of cells. This is necessary since it is impractical to transmit more than one name at a time. Thus, the control mechanism 11 merely allocates the name channel between the two ports. Such allocation may be made on a first come-first served basis or it may be set up on a priority basis. In either case, such controls are readily designed by those skilled in this art. For example, it is assumed that a device requiring service on a port would present parallel buffer cell name data as well as desired mode code (i.e. create, release, attach, purge) to the Control Logic Unit and then assert a request-for-service signal. When available and upon receipt of such a request, the Control Logic Unit performs, or attempts to perform the specified function, which includes the generation of timing and other signals such as PRENAME PULSE, serialized name data, CREATE, etc., and upon completion or failure presents a status code (success, invalid mode, etc.) along with the assertion of an acknowledgment signal to the accessing device indicating completion of the requested function. The device originating the request would then remove the request signal and the Control Logic Unit would in turn remove its acknowledgment. The Control Logic Unit would then await a subsequent request from the same or alternate port.

Since the operation of a Control Logic Unit is highly dependent on the requirements of the connecting devices, and since this particular unit is not to be considered as a part of the actual invention, but as an interface between the invention and connecting devices, a complete circuit and description are not necessary. The functional description given should serve to define the manner and sequence in which control signals are presented to the buffer cells, however. A plurality of association logic units $13_1$, $13_2$, $13_3$ ... $13_n$ are provided for cooperating with the control logic unit 11 to control the addressing and accessing of the individual buffer units. The memory storage space of the buffer system comprises a plurality of buffer shift register memories $15_1$, $15_2$, $15_3$ ... $15_n$ for the serial transfer of data bits. A control buss 17 connects the control logic unit 11 to each of the association logic units $13_n$ and includes a plurality of signal lines for transmitting the appropriate command and control signals between the control logic unit 11 and the individual association logic units $15_n$. A plurality of enable lines $19_1$, $19_2$, $19_3$ ... $19_n$ interconnect the corresponding association logic units $13_i$ and buffer shift register memories $15_i$ for enabling the transfer of data between the buffer shift register memory $15_i$ and the appropriate port under the proper circumstances. Data busses $21_A$ and $21_B$ are provided for the clocked transfer of data between ports A and B, respectively, and the access buffer shift register memory $15_i$. Command busses $23_A$ and $23_B$ are interconnected between ports A, B respectively, and the control logic unit 11 for the communication of access control signals between ports A, B and the control logic unit 11. Between the association logic units $13_i$, full-out lines $25_1$, $25_2$, $25_3$, ... $25_n$, are interconnected between adjacent association logic units to indicate to the succeeding logic unit $13_{i+1}$ whether the transmitting logic unit $13_i$ is full; the full out lines $25_i$ are also used to identify the first free cell in the sequence of buffer shift register memories $15_i$. The full out line $25_n$ of the last association logic $13_n$ is connected to ports A and B and if this output is in a high condition it will indicate over ports A and B that no free buffer units are available. The functions and interactions of the above-described elements will be described in greater detail below.

At the outset it will first be necessary to define the signals in addition to the above-described signals, which will be transmitted through the various interconnecting busses.

COMMANDS RELATED TO DECISION VARIABLE NAMES

Going to the association logic unit

NAME serially transmitted set of signals representing the identification code of the buffer memory to be accessed or created and is transmitted following the PRENAME signal which has been defined above.

NAME CLOCK: this affects the serial transfer of the name and the comparison of the name with the prior assigned names associated with each of the association logic units $25_i$.

Coming from the cells

BUSY: this signal indicates that a match has been found on the transmitted name but the selected cell is attached to another port.

READY: this signal indicates that a match has been found on the transmitted name and the selected cell having been previously allocated is ready to be attached on command to the port initiating the passage of the name. At this point it is important to note that the control logic unit 11 serves to prevent the undesired circumstance wherein one port sends the name for comparison and the other port attaches.

Going to the memory cells

CONTROL CLOCKS: to facilitate state changes as directed by the decision variable names described above.

FULL IN: equivalent to full out (described below) of the previous cell and physical linear array of memory cells. This signal is used to identify the first free cell in the line.

Coming from the cells

FULL OUT: this signal is transmitted between association logic units $13_i$ through the full out lines $25_i$. If the cell from which the signal comes is the first one free then its FULL IN signal which is the FULL OUt signal from the preceeding association logic unit will be high and its FULL OUT signal as well as the FULL OUT signals of all succeeding cells on the line will be low. This particular signal is not bussed but is only transmitted between adjacent cells and is propagated up to the first free cell and is inhibited from thereon. Thus, if the FULL OUT signal from the last association logic unit $25_n$ is high, this indicates to the ports A and B that no buffer space is available.

Association logic to buffer memory

ENABLE-FOR-A: The particular buffer memory unit is enabled for access by port A.

ENABLE-FOR-B: the particular buffer memory is enabled for access by port B.

In addition to the above-defined signals, data signals, clock signals, read/write discriminators, address, and other housekeeping signals are bussed through data busses $21_A$ and $21_B$ between the accessing port and a selection logic which generally accompanies the type of shift register memory which may be used for the buffer shift register memories $15_i$ of the present invention.

At this point an example may be helpful in understanding the cooperation of the various elements of the system and communicating signals between the elements. Assume that some cell, called C, is in the free state and is the first in line in the sequential left to right interconnection of the cells $10_i$ shown in FIG. 2. When port A furnishes a name, the name is passed down the control buss 17 following a PRENAME signal. If a cell remains in the Selected State following the associative passage of the name, that cell is the requested cell corresponding to the furnished name and that cell remains in one of the selected states and either a READY or BUSY signal is generated. However, if no cell remains in a Selected State following the associative passage of the name, then it is apparent, as indicated by the absence of READY or BUSY, that no cell contains the given name and CREATE A signal causes cell C to enter the Attached To A and Selected State. Once the cell has been created and thus attached to port A data can be transferred to the buffer memory associated with cell C from port A at any rate (within the physical limitations of the particular embodiment) specified by the port A clock.

If it is desired, port A can perform a RELEASE command causing cell C to change from the Attached State to the Allocated State. Cell C will retain its Selected State until another name is transmitted by any of the ports. With cell C in an unattached but Allocated State, port B may name and then ATTACH cell C to access data left there by any prior storage. Having thus released cell C, port A may be independently active and may access any of the other buffer memory units.

Since port B could RELEASE cell C, ATTACH some other cell, RELEASE that cell, ATTACH cell C and then possibly PURGE cell C, it is apparent that port B can totally control cell C eventhrough the cell may have been originally created by port A. In general, the following operations are arbitrary: the number of attaches and releases occurring on a given port; read or write accessing on a single attachment; and the accessing of all or part of the total buffer contents.

Figure 3:
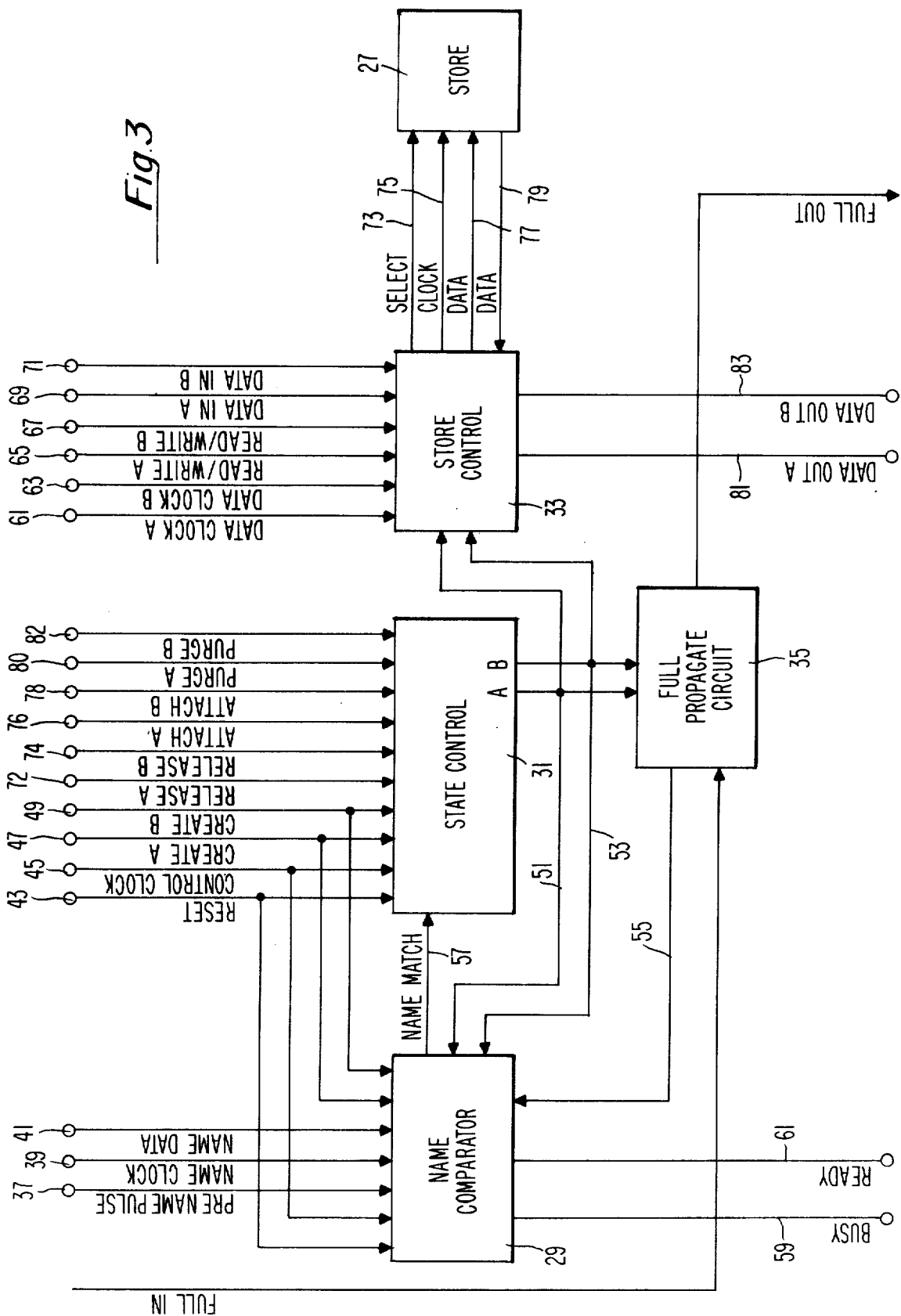
FIG. 3 is a block diagram showing the major elements of the buffer unit or cell of the present invention.

FIG. 3 shows the associative logic and buffer storage memory of the memory cell $10_i$ which comprises the basic building block of the storage system of the present invention. Generally, the storage unit 27 is used as the buffer shift register memory $15_i$ of the memory cell $10_i$; and the remaining elements of the memory cell shown in FIG. 3 comprises the associative logic units 13. Generally, the memory of FIG. 3 further includes a name comparator 29 for accepting name data from the control logic unit 11 and for determining whether the transmitted name matches the name, if any, of the particular cell. The state control unit 31 receives appropriate control signals from the control logic unit 11 for controlling the status of the particular memory cell. A store control 33 receives commands directly from the accessing port A or B and responds to these commands by performing the appropriate manipulation with the data stored in the storage unit 27. A full propagate circuit 35 responds to signals from the state control unit 31 and the full propagate circuit of the previous memory cell and generates an output signal indicative of the availability of the particular memory for access. The specific functions of each of the elements of the memory cell of FIG. 3 and the cooperation between the elements are discussed below.

At this point it is important to note that the use of "preceeding" in conjunction with a memory cell is to refer to the preceeding cell in the sequence of cells; and "succeeding" refers to the next cell in the sequence.

In the operation of the memory system all CREATE and ATTACH commands are preceded by a selection routine wherein a PRENAME signal and a name are sent to the buffer cells. In the case of a CREATE operation it is necessary to determine whether a memory cell already exists having the same name as the cell to be created. Further, in the event that no such named cell exists, it is necessary to determine whether an available cell exists and is in condition to accept the name. In the case of an ATTACH operation it is also necessary to determine whether a cell exists with a name that matches the name to be attached. In the case of a CREATE command a named cell is not presumed to already exist and if there are no available free cells then appropriate error routines must be executed. It is not comtemplated that an inadequate buffer space error would normally occur since the buffer system is modular and additional cells can be easily added as required. Similarly, for ATTACH commands an error condition may occur if a named cell does not exist. RELEASE and PURGE commands need not be preceeded by a selection routine in that it is only presumed that there will be some cell attached to the port issuing the command. That cell need not be the last one addressed, i.e. the cell need not be in the selected condition. Error routines are not required if an attempt to create or attach fails because it may by useful to simply query the state of some name in the memory cells by applying either a CREATE or ATTACH command.

In the operation of the selection routine the control logic 11 sends out a PRENAME pulse to all memory cells as the first step in determining whether a desired memory cell exists. This PRENAME pulse is received by a memory cell through a PRENAME PULSE line 37 and is used to generate a NAME MATCH signal on the NAME MATCH output line 57 which is transmitted to the state control unit 31. This operation places all memory cells in a selected state previously discussed. Subsequent to the application of the PRENAME pulse, name data is applied to each memory cell in sequence. The actual name data is applied serially to the name data line 41 and is controlled by clock pulses which are applied through the NAME clock line 39. The name comparators $29_i$ of each memory cell then concurrently associatively compare the name data received with the name associated with the particular memory cell, i.e. the name, if any, which is stored in the name comparators $29_i$. If no MISMATCH is found, a signal will remain on either of two output lines connected from the name comparator 29 to the control logic 11; the busy line 59 or the ready line $61_i$, and if a match occurs neither busy line 59 nor ready line $61_i$ transmits a signal. An output on the busy line 59 indicates that the name of the particular memory cell matches the requested name and that the memory cell is presently unavailable for access. Such unavailability could be due to the attachment of the memory cell to some other port. An output on ready line 61 indicates to the control logic 11 that the particular cell has a name which matches the name data and that the cell is available to be attached to the accessing port. If no output is received by the control logic unit 11 from either the busy line 59 or the ready line 61 then no match has been found and the memory cell is returned to whatever state it was in prior to the application of the PRENAME pulse to the prename pulse line 37. The NAME MATCH signal on the name match output 57 is also removed. Thus, it can be seen after execution of the selection routine that the control logic 11 is provided with sufficient information to determine whether a cell exists with a name which matches the name data and, if such cell exists, whether it is free for attachment to the port of inquire or if it is unavailable for attachment because it is currently attached to another port in the system.

The four major instructions to the memory cells, i.e. CREATE, RELEASE, ATTACH and PURGE will now be discussed with reference to a two-port system, port A and port B. As a convention it will be assumed that the particular instructions are originating from port A although it is equally likely and possible for the instructions to originate from port B or simultaneously from both port A and port B.

A CREATE instruction is executed when a system port desires to place information in one of the buffers. The selection routine previously explained is first executed since it is important to determine whether a cell already exists with the same name as the name of the cell which is to be created. If the selection routine results in either an output on busy line 59 or ready line $61_i$ an error condition will exists since a port will be attempting to CREATE a memory cell with a name that matches a memory cell which has already been created. If there is not a name match then a free cell must be allocated for assignment to the accessing port. The appropriate free cell is automatically selfidentified by being the first free memory cell in the series. The cell in the FREE state has a high on Full In and thus generates a low on Full Out. If, however, the Full Out signal on line 25$_n$ (FIG. 2) is high there is no free cell available and the requesting port must either wait or enter an error routine. Assuming a free cell has been located a CREATE signal is bussed to state control unit 31 over create A line 47 and the name match line 57 from name comparator 29 is set. An ENABLE A signal is asserted over line 51 to store control 33 and full-propagate circuit 35. This results in the FULL OUT signal of the memory cell attached to port A being set high. With an ENABLE A signal supplied over line 51 to store control unit 33 the appropriate inputs are accepted into the store control unit 33 directly from port A. Following the CREATE A operation, read/write A line 65 supplies a write indicating signal and information is bussed to store control unit 33 through data-in-A line 69 under the control of clock pulses from data clock A line 61 which clock pulses originate from the port attached to line 61. Finally, data is entered into the store unit 27 itself through store control unit 33 over data-in-S line 77 under the control of clock-in-out 75 while the store is selected over select-S line 73.

To summarize the CREATE procedure it can be seen that a memory cell has been transformed from the free state to the selected and attached to port A state, the appropriate name information has been entered into the name comparator 29, the state control 31 has been updated to exhibit a high signal over the FULL OUT line through full propagate circuit 35 and the appropriate date from port A has been placed in store 27 under the control of the clock signals provide over port A. This data that has been entered into store 27 could as previously explained originate from a high speed peripheral such as a disk drive or lower speed peripheral such as a consale keyboard.

When the end of the block of information which is being transferred is reached the memory cell selected and attached to port A must be released to permit access by another port in the system or reaccess by port A. This is accomplished by means of a RELEASE A signal propagated over port A upon the completion of transfer of the block of information from the peripheral which currently has control over port A.

The RELEASE routine is initiated by a RELEASE signal being supplied from port A to the memory cell which is currently selected and attached to port A or simply attached. The RELEASE signal is supplied to state control 31 over release A line 72 and the appropriate signal is supplied over ENABLE A line 51 to name comparator 29 such that if the cell is still selected as well as attached to A ready line 61$_i$ is set. Thus the cell assumes the allocated and selected state or simply the allocated state but is no longer attached to port A.

Multiple CREATE and RELEASE routines could be executed from all ports in the system to fill successive memory cells with information from peripherals currently assigned to the system ports whenever theses peripherals require buffer space. Again, the data can be clocked into the particular memory cells at different rates according to the clock rate of the current peripheral assigned to the ports. Control logic 11 insures that no two ports have access to control bus 17 during the same time interval.

To transfer further information into an already allocated memory cell or to transfer information out of an allocated memory cell an ATTACH A signal would be supplied to control logic 11. Preceeding this, however, the previously explained select routine must be performed to determine whether a memory cell exists with the same name as the name of the cell which port A is currently trying to ATTACH. Obviously if no such port exists i.e. no output evident on busy line 59 or ready line 61$_i$ there is an error or exception condition in the buffer system since a port is trying to ATTACH a memory cell which does not exist. Following the selection routine and assuming the desired cell has been located in the buffer system only that particular cell will remain selected. For the selected cell, name match line 57 is set as is busy line 59 to insure that no other port can attach the memory cell at that point. The ATTACH A signal has been supplied to state control 31 over attach A line 76 and an ENABLE A signal has been propagated to store control unit 33 over enable A line 51. If the memory port is attempting to access or empty the information out of the particular memory cell a read signal will be supplied to store control 33 over read/write A line 65 and clock signals, at the rate of the peripheral assigned to port A, will be supplied over data clock A line 61 and clock-S line 75 to result in information being transferred from store 27 through data-S bus 79 to store control 33 and out line 81 to data bus 21 and thus to the peripheral currently assigned to port A.

To summarize, a memory cell has been transformed from the free and unallocated state to the selected and attached to port A state by a CREATE A routine. Data at this point was transferred into the cell from port A and upon completion of transfer a RELEASE A signal transformed the memory cell into the allocated state or the allocated and selected state. The memory cell became at this point unattached to any port. An ATTACH A signal preceeded by an appropriate selection routine returned the port to the selected and attached to port A state in which condition data was transferred from the memory cell to port A under the influence of the particular clock currently influencing port A. Assuming that all the pertinent information has been transferred and, for example, when triggered by an end-of-block signal positioned at the dnd of the data block, port A will issue a RELEASE A signal to return the port to the allocated or the allocated and selected state where the cell is again unattached to any port.

From the allocated and selected state the creation or attaching of any other cell to any port using the buffer system will result in the memory cell of our example assuming an allocated and unselected state. In many applications the transfer out of information from a memory cell, which corresponds to the emptying of a buffer, signifies the end of the requirement of that particular buffer space by the part to which it was attached. At this point it may be desirable to return the buffer space to the system for utilization by any other peripheral device. In fact, the associative buffer pool specifically provides for such a return in order to minimize the number of buffer areas which must be employed by the system to accommodate all the peripherals. To return a buffer back to the buffer system, a port, which for example may have accessed the contents of a data memory cell, will issue a PURGE signal after attaching the cell. The cell is attached by first performing the previously defined selection and attaching routines. The actual purge is accomplished by supplying a PURGE command to state control 31 over purge A line 80. The full propagate circuit 35 sets FULL OUT to a low value and the name comparator 29 is instructed over enable A line 51 to remove the name match signal from line 57. The PURGE A instruction places the memory cell in the free and unallocated state for subsequent re-creation by any port which is sharing the buffer system.

The previous explanation was all in relation to a two-port system with port A doing all of the manipulation of the memory cells intthe buffer system. This is intended, however, for example only since it can be readily seen that a multitude of ports assigned to peripherals having different clock rates can utilize the buffer system as an interface with other ports of other parts of the system wherein the buffers are employed.

Figure 4:
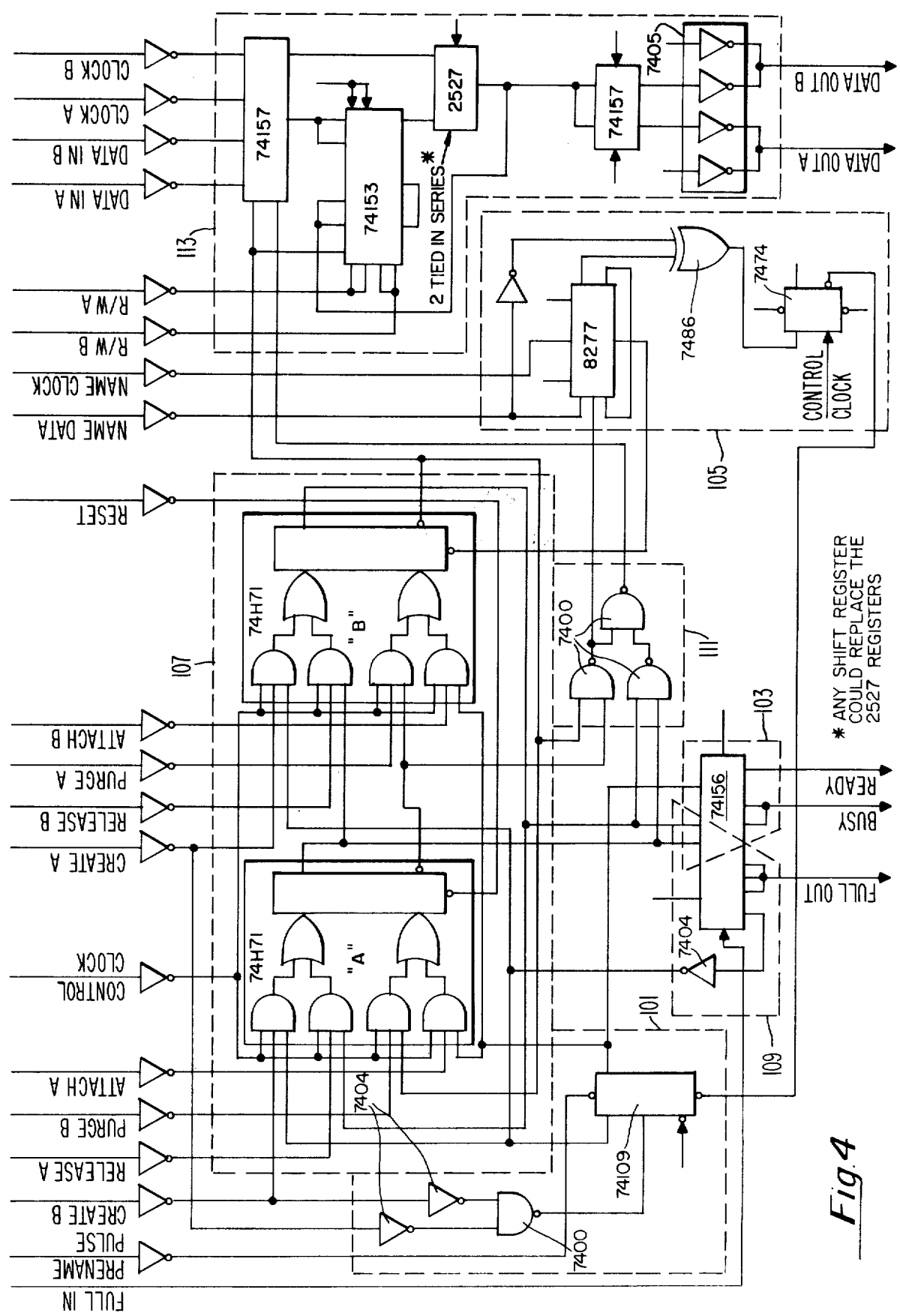
FIG. 4 is a circuit diagram schematically showing an embodiment of the present invention.

FIG. 4 is schematically illustrative of an embodiment of the logic and associated logic devices employed in a memory cell of the present invention. The figure has been subdivided by dashed lines to indicate the components which accord with the block diagram shown in FIG. 3. The elements within dashed line portions 101, 103 and 105 correspond to name comparator 29 of FIG. 3. Blocked in portions 107 schematically shows an appropriate embodiment of state control 31. Full propagate circuit 35 is shown as 109 in FIG. 4. Finally, the elements within dashed blocks 111 and 113 embody store control 33 and store 27 of FIG. 3.

FIG. 4 illustrates in detail the memory cell including references to commercial elements which have been used to create this invention. The numerals referenced in each box denote, for example, Signetics Corporation devices, however, other manufacturers also product corresponding devices having the same nomenclature. The elements within dashed line portions 101, 103 and 105 which, as mentioned earlier, correspond to name comparator 29 of FIG. 3, includes in portion 101 a pair of HEX inverters (7404's) inputting a quadruple 2 input positive nand gate (7400). The output of this nand gate is then combined with the output of a 7404 inverter element of portion 109 to provide the input to the Dual J-K positive edge triggered flip-flop 74109. This flip-flop when triggered by a clock pulse from the flip-flop 7474 and an input signal from the input line (referenced as prename pulse) provides an input to the decoder-multiplexer 74156. Simultaneously, inputs are provided to a pair of J-K Master/Slave flip-flops (74H71A&B). The first of these flip-flops (74H71A) is associated with the Attach "A" input line and the second one (74H71B) corresponds to the input line for the Attach "B" pulse. The shifting mechanism is a dual 8-bit shift register which provides 16 bits of serial storage for buffering purposes. The name data information flows through this shift register in step with the name clock pulses.

The data into the memory is selected by a first selector (74157) to be either from the Data-in "A" line or the Data-in "B" line under the control of the appropriate clock signals. A second selector (74153) determines the selected read/write input to the 2-256 bit static shift registers (2527). Note that a pair of these shift registers are selectively determined by an output selector (74157) to the correct output line Data-out "A" or Data-out "B".

It will be understood that the above-description and accompanying drawings are illustrative of a single embodiment of the present invention and that various changes and alterations may be made by those skilled in the art without departing from the scope and spirit of the invention as set forth in the appended claims.

What is claimed is:

1. A time-shared modular digital storage system for access and use by a plurality of independently functioning data ports supplying digital information comprising:
a plurality of linearly interconnected memory cells for storing digital information, each memory cell having a name associated therewith when digital information is stored therein, each memory cell having associative addressing logic means for identifying the name associated with that particular memory cell; and
control means cooperating with said data ports and said plurality of memory cells for accepting requests for access to memory cells from any of said data ports individually, each said request including a name and operational commands supplied by the requesting port, said control means further cooperating with the data ports and the memory cells for allocating access to a memory cell by a requesting data port when the supplied name matches the name associated with the memory cell; each said memory cell including name comparator means accepting supplied names from the control means for associatively detecting a match between a supplied name and the name associated with any of the memory cells, said name comparator means further including means assigning the supplied name to a memory cell in response to said operational requests when the supplied name fails to match the name associated with any of the memory cells.

2. The time-shared digital storage system of claim 1 wherein each of said memory cells comprises:
means for storing the digital information supplied by said data ports;
said name comparator means including means for generating status signals in response to said match, said status signals indicating said matched memory cell is either available for access by the requesting data port or unavailable for access by the requesting data port;
state control means receiving the operational commands from the data ports through the control means for attaching a memory cell to a requesting data port and for establishing a memory cell in either of three states in response to said operational commands, (1) an attached state wherein said memory cell is attached to a data port and has associated therewith a name matching the name supplied by the attached port, (2) an available state wherein said memory cell has a name associated therewith and is unattached to a data port or (3) a free state wherein said memory cell is not attached to a data port and does not have a name associated therewith and
storage control means for controlling the transfer of digital information between the memory cell and an attached data port.

3. The time-shared digital storage system of claim 2 wherein said means for storing digital information is a shift register.

4. The digital storage system of claim 3 further including:
a command buss associated with each of the data ports for transmitting the supplied name and operational commands to the control means;
a control bus interconnecting the memory cells to the control means for transmitting supplied names and operational commands to said memory cells and for transmitting status signals from said memory cells to said control means; and
a plurality of data busses singly associated with each of the ports for transferring digital information between the data ports and each of the memory cells at a transfer rate associated with the transferring data ports.

5. The digital storage system of claim 4 further including status lines interconnecting adjacent memory cells for transmitting to the succeeding memory cells a free signal from the state control means of the preceeding memory cell when said preceeding memory cell is in the free state.

6. A time-shared, modular, buffer memory storage pool comprising:
   a plurality of serially interconnected memory cells for storing digital information, each said memory cell having an identifying name associated therewith when digital information is stored therein
   a plurality of associative addressing logic means singly associated with respective memory cells for enabling simultaneous associative accessing of said memory cells in response to an access request;
   a plurality of independently functioning data ports attachable to said memory cells for transferring digital information to and from the memory cells at transfer rates associated with the data ports, said data ports supplying access requests to the memory cells, said access requests including the name associated with the memory cell to be accessed; and
   control means cooperating with the associative addressing logic means and with the data ports for accepting an access request for a memory cell from any of the data ports and for allocating access to the memory cell by the requesting data port if the name of the memory cell matches the supplied name and the memory cell is not attached to a data port; each said associated logic means including name comparator means accepting supplied names from the control means for associatively detecting a match between a supplied name and the name associated with any of the memory cells, said name comparator means further including means assigning the supplied name to a memory cell in response to said operational requests when the supplied name fails to match the name associated with any of the memory cells.

7. The buffer memory storage pool of claim 6 wherein each of said memory cells include means for generating response signals in response to said access requests, said response signals indicating a match between a name supplied by a requesting data port and the name associated with a memory cell, said response signals further indicating whether said matched memory cell is available for access by said requesting data bus or whether said matched memory cell is attached to another of said data ports and unavailable for access by said requesting data port.

8. The buffer memory storage pool of claim 7 wherein each of said memory cells includes state control means for attaching a named memory cell to a requesting data port when the name supplied by the data port matches the name associated with a named memory cell.

9. The buffer memory storage pool of claim 7 further including:
   a plurality of command busses singly interconnecting respective data ports with the control means for transmitting access requests from said data ports to said control means;
   a control buss interconnecting the control means with the memory cells for transmitting access requests from the control means to the associative addressing logic means;
   a plurality of enable lines interconnecting each of said memory cells with their associated addressing logic means, said enable lines singly associated with respective data ports for enabling the transfer of digital information between a memory cell and a requesting data port when said requesting data port is attached to said memory cell; and
   a plurality of data busses singly interconnecting each of said data ports with each of said memory cells for the transfer of digital information therebetween.

10. The buffer memory system of claim 9 wherein said memory cell includes means for bidirectional serial transfer of information between said memory cell and an enabled and attached data port.

11. A time-shared digital data storage system for the transfer of data between independently functioning, requesting data ports responsive to access requests supplied by the data ports where said access requests include a storage operation, a name and data transfer clock signals, the storage system comprising:
   control means cooperating with the data port for accepting access requests therefrom;
   a plurality of linearly interconnected memory cells singly attachable to any of the data ports for accepting and storing data from an attached data port and transferring data to an attached data port in accordance with the storage operation and the data transfer clock signals supplied by the requesting data port, each said memory cell having a name associated therewith when data is stored therein
   associative addressing means associated with each memory cell for detecting a match between a name supplied by a requesting data port and a memory cell name for attaching said matched memory cell to said requesting data port, each of said associative addressing means further including means generating response signals indicating whether its associated memory cell is attached to a data port; each said associative logic means including means assigning the supplied name to a memory cell in response to said operational request when the supplied name fails to match the name associated with any of the memory cells;
   a control buss interconnecting the associative addressing means with the control means for transmitting storage operations and supplied names to the memory cells and for transmitting response signals from the memory cells to the control means;
   a plurality of enable busses singly provided to interconnect a memory cell with an associated associative addressing means;
   a data buss associated with each of the ports for transmitting data between the port and the memory cells; and
   full propogate means including status lines for generating status signals along said lines, said status lines interconnecting adjacent memory cells for transmitting to the succeeding cell a signal indicating the state of the preceeding cell.

12. The digital data storage system of claim 10 wherein each of said memory cells includes means for storing digital data and for bidirectionally, serially transferring digital data between an attached data port and said memory cell.

* * * * *